US011321554B2

(12) United States Patent
Edelen et al.

(10) Patent No.: US 11,321,554 B2
(45) Date of Patent: May 3, 2022

(54) EFFICIENT MANAGEMENT OF FACIAL RECOGNITION SYSTEMS AND METHODS IN MULTIPLE AREAS

(71) Applicant: Universal City Studios LLC, Universal City, CA (US)

(72) Inventors: Jacob Andrew Edelen, Orlando, FL (US); Howard Bruce Mall, Jr., Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 112 days.

(21) Appl. No.: 16/777,665

(22) Filed: Jan. 30, 2020

(65) Prior Publication Data

US 2021/0240969 A1 Aug. 5, 2021

(51) Int. Cl.
  *G06K 9/00* (2006.01)
  *G06F 16/583* (2019.01)
  *G06F 16/51* (2019.01)
  *G07C 9/25* (2020.01)

(52) U.S. Cl.
  CPC ......... *G06K 9/00288* (2013.01); *G06F 16/51* (2019.01); *G06F 16/5854* (2019.01); *G06K 9/00281* (2013.01); *G07C 9/257* (2020.01)

(58) Field of Classification Search
  CPC .............. G06K 9/00288; G06K 9/6202; G06F 16/5854; G06F 16/51; G07C 9/257
  See application file for complete search history.

(56) References Cited

U.S. PATENT DOCUMENTS

| 7,634,662 | B2 | 12/2009 | Monroe |
| 2009/0161921 | A1 | 6/2009 | Ohnishi |
| 2014/0270383 | A1 | 9/2014 | Pederson |
| 2014/0363046 | A1 | 12/2014 | Besterman et al. |
| 2019/0043281 | A1 | 2/2019 | Aman |
| 2019/0244018 | A1 | 8/2019 | Fidaleo |
| 2019/0325682 | A1* | 10/2019 | Petkov ..................... H04N 5/33 |
| 2020/0057885 | A1* | 2/2020 | Rao ..................... G06K 9/00771 |

OTHER PUBLICATIONS

PCT/US2021/013982 International Search Report and Written Opinion dated Apr. 12, 2021.

* cited by examiner

*Primary Examiner* — Ruiping Li
(74) *Attorney, Agent, or Firm* — Fletcher Yoder, P.C.

(57) ABSTRACT

Systems and methods may increase facial recognition throughput by reducing search data as a person traverses through a theme park. Systems and methods include storing facial identification data in a theme park database as guests enter a theme park and removing facial identification data in the theme park database as guests exit the theme park. In this manner, the theme park database includes facial identification data of guests inside the theme park, and not of guests who have left the theme park, thereby reducing the size of the theme park database as guests exit the theme park. Similarly, this approach may be implemented within each of the various areas of the theme park, such that the size of databases associated with each area of the park only includes entries corresponding to guests in the particular park area.

20 Claims, 6 Drawing Sheets

EFFICIENT MANAGEMENT OF FACIAL RECOGNITION SYSTEMS AND METHODS IN MULTIPLE AREAS

BACKGROUND

The present disclosure relates generally to facial recognition. More specifically, the present disclosure relates to managing facial recognition identification data gathering and storage.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many venues, such as theme parks, concert venues, and the like, manage access rights for large groups of visitors. Such venues often utilize traditional queuing systems to control access and manage throughput. For example, traditional paper ticketing systems are often utilized to confirm access rights, retrieve guest information, and/or control the number of guests admitted to the venue within a particular timeframe. More modern techniques for confirming access rights, retrieving guest information, and/or controlling the number of admitted guests may involve the use of biometric data, such as fingerprint scanning or facial recognition techniques. Utilizing biometric data may require a large volume of data storage and computational resources, which may increase the computational complexity associated with confirming access rights and controlling the number of admitted people. As a result, confirming access rights by way of these modern techniques may result in delays and/or inaccurate confirmations (e.g., false positives). The computational complexity associated with these modern techniques is complicated as the number of guests in attendance increases, for example, during periods of seasonal popularity.

Use of biometric data may be appealing for confirming access rights and for controlling the number of admitted people because it does not usually require a guest to carry a traditional paper ticket. However, there is a need to improve existing techniques for efficiently managing the large volume of biometric data, the implementation of which may be difficult to practice and to coordinate in various large venues.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure provides systems and methods that may increase facial recognition throughput, reduce time to process facial recognition access/requests, reduce the amount of facial recognition data used for a search, and/or improve the accuracy of verifying facial identities of guests by reducing search data as a person traverses through a theme park. Systems and methods of the present disclosure include storing facial identification data in a theme park database as guests enter a theme park and removing facial identification data in the theme park database as guests exit the theme park. In this manner, the theme park database includes only facial identification data of guests inside the theme park, and not of guests who have left the theme park, thereby reducing the size of the theme park database as guests exit the theme park. Similarly, this approach may be implemented within each of various areas of the theme park, such that the size of databases associated with each area of the park only includes entries corresponding to guests in the particular park area.

In an embodiment, a system for increasing facial recognition throughput includes an image capture device associated with an area within a venue to capture a facial image. The venue is associated with a first database, and the area is associated with a second database. The system also includes a computing system communicatively coupled to the image capture device. The computing system includes processing circuitry and a memory device communicatively coupled to the processing circuitry. The memory device stores instructions executable to cause the processing circuitry to perform operations. The operations include receiving the facial image and determining a sufficient correlation between the facial image and an entry of a plurality of entries of facial identification data stored in the first database, and in response to the facial image sufficiently correlating to the entry, adding the facial image to the second database.

In an embodiment, a method executed via processing circuitry is provided. The method includes determining entrance facial identification data from a first facial image captured by an entrance image capture device positioned at an entrance to a venue. The method includes storing the entrance facial identification data in a venue database that stores a plurality of facial identification data entries. The method includes transferring the entrance facial identification data from the venue database and into an area database associated with an area of the venue in response to a second facial image captured at an entrance to the area of the venue sufficiently correlating to the entrance facial identification data. The method includes receiving, via the processing circuitry, a third facial image captured by an exit image capture device positioned at an exit of the venue and determining a sufficient correlation between exit facial identification data associated with the third facial image and an entry of the plurality of facial identification data entries. The method includes removing the entry of the plurality of entrance facial identification data entries from the venue database in response to determining that the exit facial identification data sufficiently correlates to the entry of the plurality of facial identification data entries.

In an embodiment, a facial recognition system for increasing facial recognition throughput includes a primary image capture device configured to capture a first facial image at an entrance to a theme park and a plurality of secondary image capture devices corresponding to a plurality of areas of the theme park, such that the plurality of secondary image capture devices capture a secondary facial image at an entrance to a corresponding area of the plurality of areas of the theme park. The facial recognition system further includes a storage device that includes a theme park database of facial identification data associated with the first facial image and a plurality of park area databases. Each park area database of the plurality of park area databases is associated with a respective area of the plurality of areas, such that each park area database of the plurality of park area databases includes facial identification data associated with a respective secondary facial image. The facial recognition system further includes a computing system communicatively coupled to the primary image capture device, the plurality of secondary image capture devices, and the storage device. The computing system includes processing circuitry, and a memory device storing instructions to cause the processing circuitry to perform operations. The operations include receiving the first facial image to generate corresponding facial identification data and store the corresponding facial identification data in the theme park database. The operations include receiving a particular secondary facial image captured by a particular secondary image capture device of the plurality of secondary image capture devices to determine a sufficient correlation between the particular secondary facial image and the corresponding facial identification data, such that the particular secondary image capture device is associated with a particular area of the plurality of areas. Furthermore, the operations include adding the corresponding facial identification data from the theme park database to a particular park area database associated with the particular area based on the sufficient correlation.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
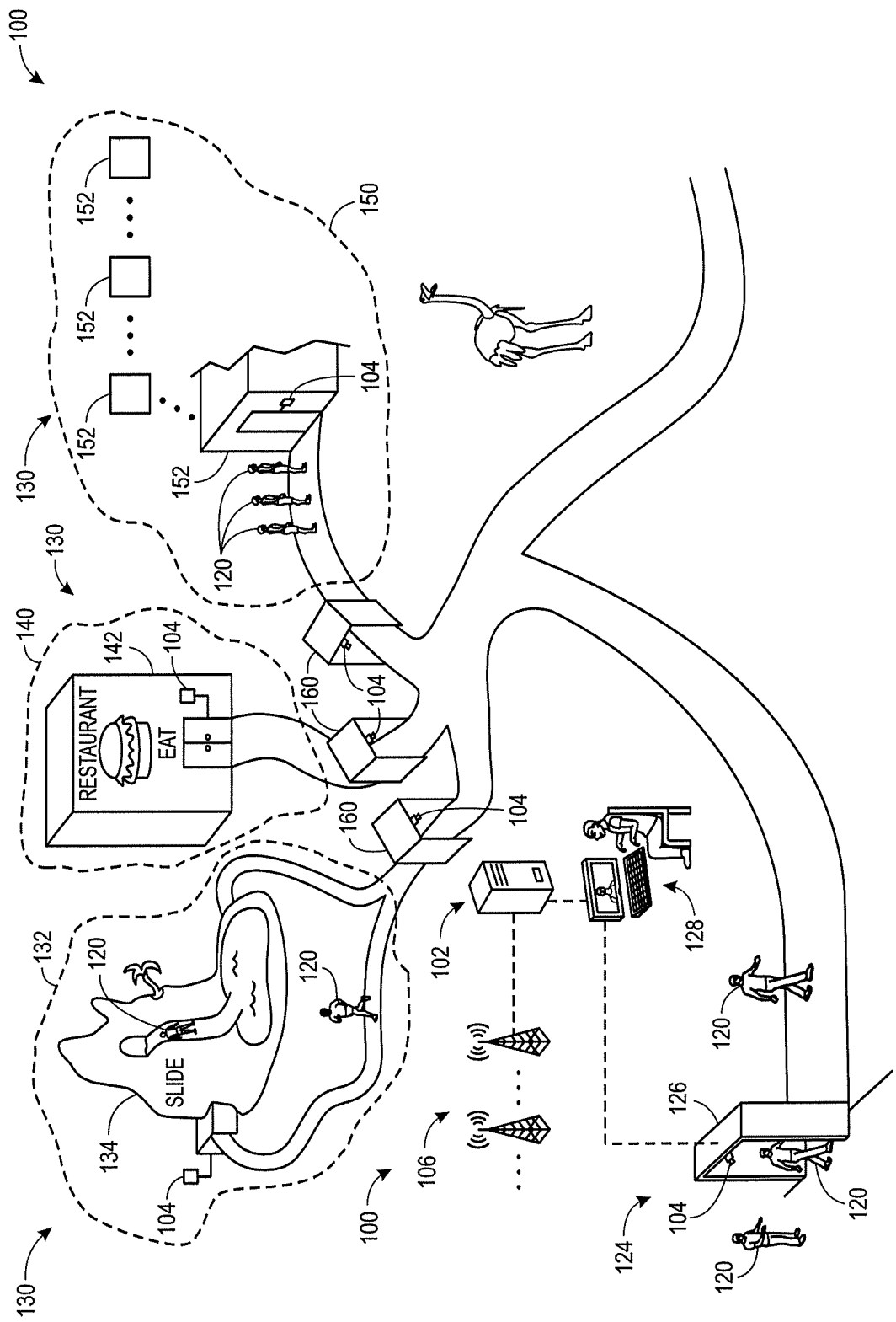
FIG. 1 is a schematic representation of a theme park, including multiple park areas, that uses facial recognition techniques for guest management, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

While the following discussion is generally provided in the context of a theme park, it should be understood that the embodiments disclosed herein are not limited to such entertainment contexts. Indeed, the systems, methods, and concepts disclosed herein may be implemented in a wide variety of applications. The provision of examples in the present disclosure is to facilitate explanation of the disclosed techniques by providing instances of real-world implementations and applications. It should be understood that the embodiments disclosed herein may be useful in many applications, such as event venues (e.g., concerts), restaurants, large commercial buildings, hospitals, and/or other industrial, commercial, and/or recreational systems servicing a wide variety of clients/users, to name a few additional examples.

With this in mind, the present disclosure provides systems and methods for increasing facial recognition throughput, reducing processing time for facial recognition access, reducing the amount of facial recognition data used for a search, and/or improving accuracy of verifying facial identities by reducing search data as a guest traverses through a theme park (e.g., amusement park or entertainment venue) and engages with various features accommodating facial recognition techniques (e.g., accessing theme park rides, paying for food, accessing profile data, and so forth). As discussed above, certain venues, such as theme parks, may use facial recognition technology to confirm a guest's identity and access rights, to retrieve information associated with the guests, as well as to control the number of people admitted into the venue within a particular timeframe. Successful implementation of facial recognition technology may require a large volume of data storage, which may increase the computational complexity associated with confirming the access rights and the identity of a person. As a result, confirming access rights by way of these modern facial recognition techniques may result in delays and/or inaccurate confirmations (e.g., false positives).

For example, determining whether a database of facial identification data stores information corresponding to a guest may include determining that a newly captured facial image of the guest substantially correlates (e.g., within a target percent of accuracy) to an entry of facial identification data stored in the database. While simplifying the calculations by examining fewer facial features may increase the speed of identifying the guest, this approach may result in false positives (e.g., the guest may be associated with the wrong entry of facial identification data). Accordingly, there is a need to improve the speed of confirming the identity of persons by using facial recognition technology without compromising the accuracy of the identification. As used herein, "facial identification data" may refer to identification information extrapolated from a facial image and may be associated with a particular profile of the guest to facilitate facial matching and granting access based on the match. As used herein, "logic" may refer to hardware, software, or both executable to perform a series of steps. While the discussion below includes a discussion associated with determining a "match" between a captured image to a stored image, it should be understood that "match" may refer to a sufficient correlation between the captured image and the stored image using the techniques disclosed below.

The present disclosure includes systems and methods addressing this issue by storing facial identification data in a theme park database as guests enter a theme park and removing facial identification data in the theme park database as guests exit the theme park. In this manner, the theme park database includes facial identification data of guests inside the theme park (and not of guests who have left the theme park), thereby reducing the size of the theme park database as guests exit the theme park. As used herein, "theme park database" refers to a database (e.g., a Structured Query Language [SQL] database, a non-Structured Query Language [NoSQL] database, and so forth) that includes facial identification information of the guests in attendance in the entire theme park. As used herein, "park area database" refers to a database (e.g., SQL database, NoSQL database, and so forth) that includes facial identification data of the guests in a particular area or zone of the theme park. For example, the entries in the park area database may include a smaller subset of the entries in the theme park database that correspond to a park area of the theme park. Each park area in the theme park may include a corresponding park area database.

A computing system may receive a facial image (e.g., captured by an image capture device) of a guest as the guest enters the theme park and store corresponding facial identification data. As the guest enters a particular area within the theme park, the computing system may receive another facial image of the guest, match the facial image to facial identification data in the theme park database, and then store the matching facial identification data from the theme park database in the park area database corresponding to the particular area within the theme park. In this manner, as the guest interacts with facial recognition technology (e.g., image capture devices) in the particular area, the accuracy and speed of performing facial recognition techniques may be improved because facial recognition calculations are performed with the smaller park area database instead of the larger theme park database.

The computing system may receive an additional facial image as the guest leaves the particular park area, causing the computing system to remove the matching facial identification data from the park area database. In this manner, the size of the park area database is reduced as guests leave the park area, thereby reducing the computational burden associated with performing facial recognition techniques in the corresponding park area. The computing system may receive an additional facial image as the guest leaves the theme park, causing the computing system to remove the corresponding facial identification data from the theme park database (and all park area databases). In this manner, the size of the theme park database is reduced as guests leave the theme park, thereby reducing the computational burden associated with performing facial recognition techniques in the theme park.

While the discussion for reducing the size of a database is described in the context of dividing a larger database into smaller databases based on the location of guests (e.g., as captured by image capturing devices and as verifying by the computing system), it should be understood that the size of a database may be reduced based on additional or alternative characteristics of a guest. For example, the larger database may be reduced to respective databases based on whether the guest is a regular park attendant or whether the guest is an infrequent theme park attendant (e.g., park hopper). As another example, a database may be divided into smaller databases, such as a smaller database for guests having a wearable device and another smaller database for guests not having a wearable device. Furthermore, the wearable device may be of a first type or a second, such that the smaller database may be further broken down into an even smaller database associated with guests wearing the first type of wearable device and another even smaller database associated with guests wearing the second type of wearable device.

With the foregoing in mind, FIG. 1 is a schematic representation of a theme park 100, including park areas, that utilizes facial recognition techniques for guest management, in accordance with aspects of the present disclosure. The theme park 100 includes a computer system 102, image capture devices 104, and a communication network 106, as well as other components that coordinate in accordance with the present disclosure, as will be described in detail below. Certain aspects of the theme park 100 will be referenced with respect to the steps they perform or facilitate as illustrated in the process shown in FIG. 3. Specifically, it should be noted that present implementations facilitate employing facial recognition techniques in theme parks, increasing facial recognition throughput without compromising the accuracy of the facial recognition techniques. In this manner, guests 120 may traverse through the theme park with little to no physical identification items (e.g., traditional tickets or identifying bracelets) granting access to guests 120.

Figure 3:
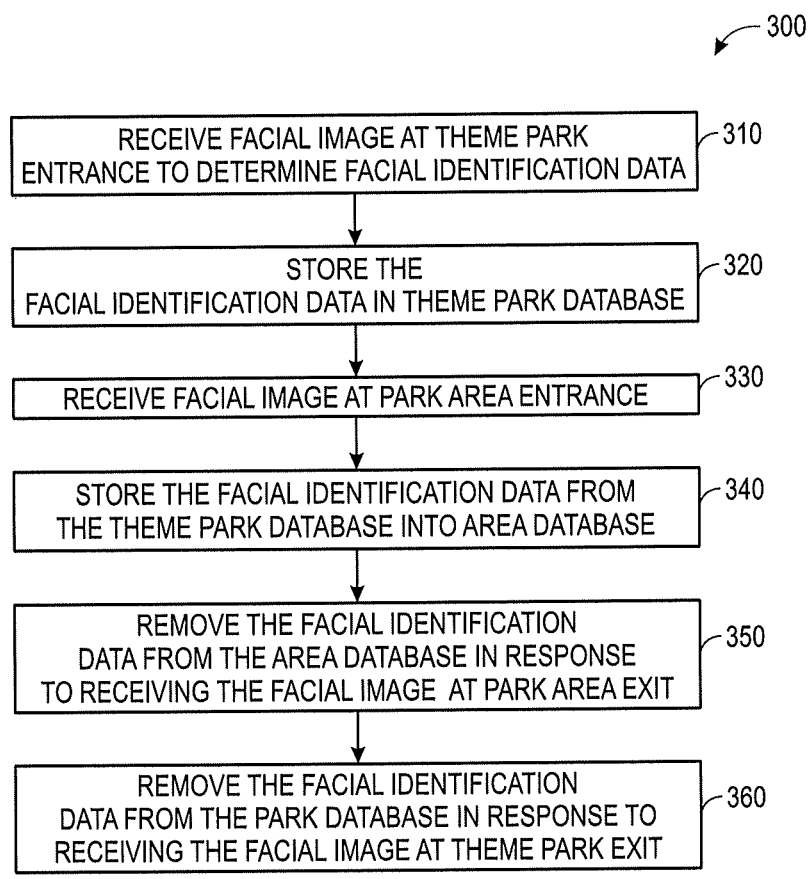
FIG. 3 is a flow diagram of a process for increasing facial recognition throughput of the theme park of FIG. 1, in accordance with aspects of the present disclosure.

When guests 120 arrive at a park entrance location 124 (e.g., hotel front desk, kiosk, guest service counter, park gate), the image capture device 104 may capture a facial image of the guests 120 and send the captured facial image to the computing system 102, which may determine and store corresponding facial identification data associated with the guests 120 in a theme park database, as discussed in FIG. 3. In an embodiment, the guests 120 may be provided with additional entry credentials (e.g., tickets or active wearable devices) among other items, such as a park map, dining and lodging instructions, and amenities instructions. Informational media (e.g., audio, video) and instructional signage indicating instructions for taking a facial image by way of the image capture device 104 may be present at all such park entrance locations 124. In some instances, guests 120 may submit facial images to the theme park 100 (e.g., by uploading a facial image via a website of the theme park ahead of time) and may skip acquiring such credentials at the park entrance location 124.

Guests 120 may enter and be provided entry into the theme park an entryway 126. Specifically, as illustrated in FIG. 1, the entryway 126 may exclude a physical turnstile or similar physical traversal counting or control feature that can provide an impediment to traversal of the entryway 126 when the entryway 126 is intended to be open. In an embodiment, after the computing system 102 receives the facial image captured by the image capture device 104, the computing system may actuate a physical turnstile granting the guest 120 access to the theme park 100. It should be understood that, in an embodiment, the entryway 126 may be turnstile-less during operation.

The theme park 100 may employ other entry techniques in addition or alternative to entry by way of facial recognition techniques. For example, guests 120 may have their entry credentials or an identification code or number transferred into an active wearable device, having a unique identifier. As such, the guests 120 may be provided essentially direct access to the park or park area. For example, guests 120 with properly activated active wearable devices may be allowed to walk through the entryway 126 without stopping. The credentials associated with the activated active wearable devices held or worn by the guests 120 may be detected and provided to a gate monitoring facility 128 that may be monitored by a park employee (e.g., a security service company). Furthermore, the activated active wearable device may be associated with the same guest profile associated with the captured facial image stored by the computing system 102. Guests 120 may opt out of using the facial recognition technology of the theme park, and instead opt in to using alternative access grant methods, such as the wearable device. Accordingly, the embodiments disclosed herein may be used by guests employing wearable devices, facial recognition technology, and/or other methods for granting and/or tracking guest access.

Furthermore, while the present disclosure is discussed in the context of facial images being used for identification and access control purposes, other biometric data may be used, such as fingerprints or other identifying aspects (e.g., eye recognition). Furthermore, the computing system may receive information from guests 120 by any suitable devices, such as pocket-carried wireless devices, wearable devices, handheld devices, or mobile devices, via transmitters/receivers disposed in the devices. In an embodiment, the guest-associated devices may be waterproof.

After the computing system 102 stores facial identification data of the guest 120, the guests 120 may be granted access to the theme park 100. The computing system 102 may associate the profile of each guest 120 to the corresponding facial identification data of the guest 120. For example, the guest profile may include access to certain features of the theme park and may restrict access to other features of the theme park 100. In this manner, the computing system may grant the guest 120 access to authorized features of the theme park 100 commensurate with the permissions defined by the guest profile. As used herein, such permission information and personal information associated with the guest may be referred to as "profile data." Access to the theme park 102 may be granted in response to the computing system 102 actuating turnstiles, lifting gates, unlocking doors, and/or any other suitable actuatable device. In the absence of any actuatable devices, the computing system 102 may alert security personnel in response to receiving an indication of a guest in a restricted area.

As mentioned above, the profile of each guest may be alternatively or further broken down based on data other than facial identification data. For example, a database may be divided into smaller databases, such as a smaller database for guests having a wearable device and another smaller database for guests not having a wearable device. Furthermore, the wearable device may be of a first type or a second type, such that the smaller database may be further broken down into an even smaller database associated with guests wearing the first type of wearable device and another even smaller database associated with guests wearing the second type of wearable device.

As illustrated, the theme park 100 includes various park areas 130. For example, the theme park 100 may include a first park area 132 including a water park 134; a second park area 140 including a restaurant area 142; and a third park area 150 including a ride systems 152. While the illustrated theme park 100 includes three park areas 130, it should be understood that the theme park 100 may include any suitable number of park areas 130 with any suitable features.

The park areas 130 may include park entrances 160, including corresponding image capture devices 104. In the illustrated schematic, the park areas 130 are defined and bounded by dashed lines. As described in more detail below, as guests 120 enter the park areas 130 via the park entrances 160, the image capture device 104 may capture a facial image of the guest 120 and send it to the computing system 102 via the communication network 106 (e.g., for verification/authentication purposes). For example, in the context of the first park area 132, the computing system 102 may receive the live facial image of the guest 120 seeking access to the first park area 132 and determine whether the facial image matches the facial identification data of an existing entry in the theme park database. In response to the facial image matching the facial identification data of an existing entry in the theme park database, the computing system 102 may copy the matching facial identification from the theme park database into the park database associated with the first park area 132.

In the case of no match being determined, the computing system 102 may add the facial image to a list of "unknown" images, track the guest using cameras in the park, attempt to take subsequent facial images to match the facial image to facial identification data of an existing entry in the theme park database, and/or any other suitable action. In an embodiment, in response to determining that the facial image does not match an existing entry in the theme park database, the computing system 102 may alert security personnel.

Furthermore, the features of the park areas 130 may also include image capture devices 104. For example, the water park 134 may include an image capture device 104 to determine whether the guest 120 purchased an access package granting access to the water park 134. To make this determination, the computing system 102 may receive the facial image captured by the image capture device 104 of the water park 134 to determine whether the captured facial image matches facial identification data (in the area database) corresponding to an entry having access to the water park 134.

In another example, the restaurant area 142 may include an image capture device 104 to facilitate payment for the food. For example, the computing system 102 may receive the live facial image captured by the image capture device 104 of the restaurant area 142 to match the facial image to facial identification data (in the area database) to bill the account associated with the matching facial identification data. This may be of particular convenience to guests 120 seeking not to use cards, cash, or other payment methods within the theme park 100 (e.g., because the guest 120 may be exposed to water).

In yet another example, the ride system 152 may include an image capture device 104 to determine whether the guest 120 has access to the ride system 152. To make this determination, the computing system 102 may receive the facial image captured by the image capture device 104 of the ride system to determine whether the live facial image matches facial identification data (in the area database) corresponding to an entry having access to the ride system 152. As described above, it should be understood that certain guests 120 may opt out of using the facial recognition technology of the theme park, and instead opt in to using alternative access grant methods, such as the wearable device. Accordingly, determination of whether to grant access to the ride system 152 may be alternatively based on access rights associated with the wearable device, having a unique identifier corresponding to the profile data of the guest. The guest may also be tracked via the wearable device. Furthermore, the determination of whether to grant access may be based on an age, weight, or height of the guest 120, such that access to a guest 120 not satisfying the age, weight, or height requirements may be restricted.

Figure 2:
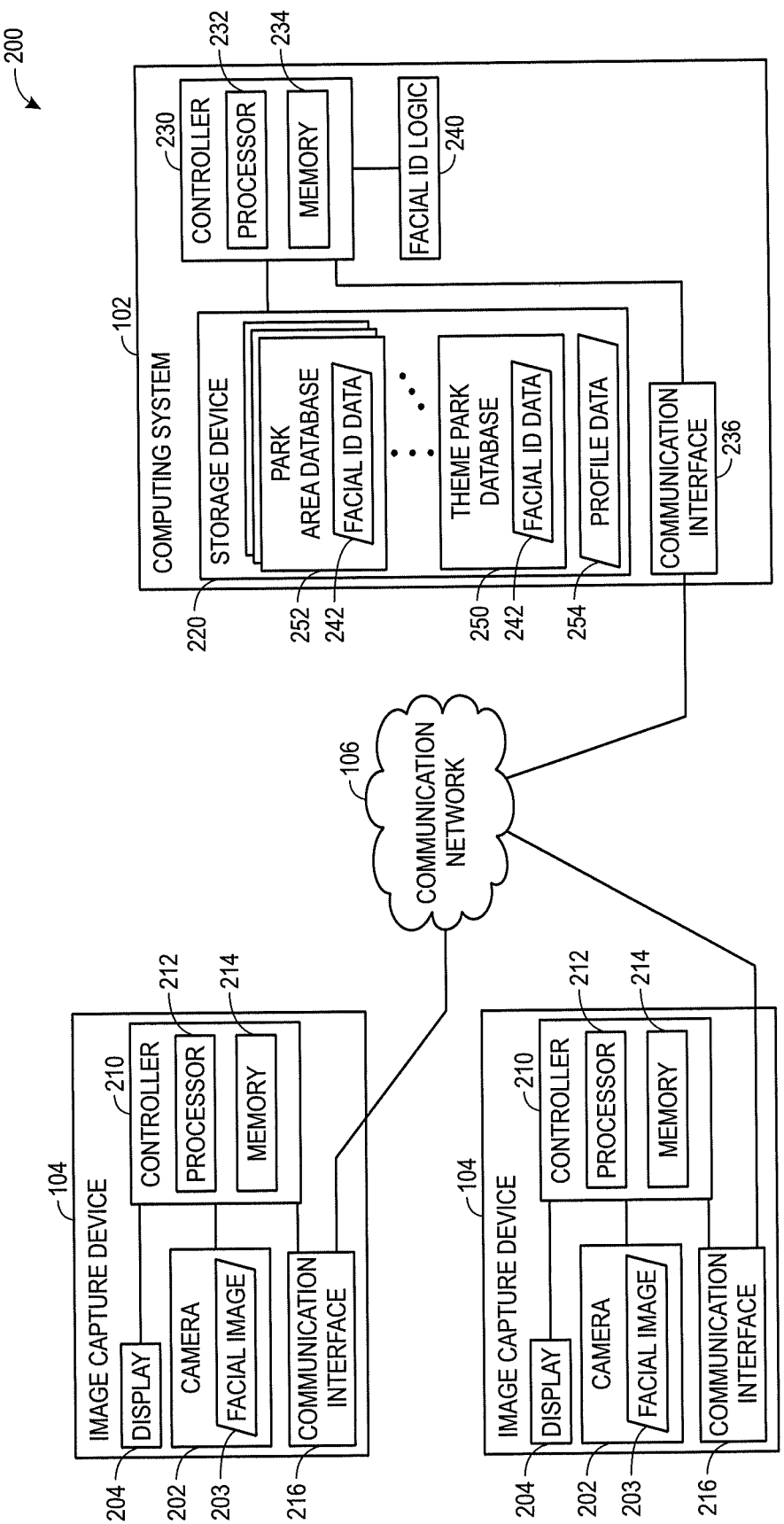
FIG. 2 is a block diagram of a facial recognition system employing facial recognition techniques by using a theme park database and park area databases corresponding to the park areas of FIG. 1, according to aspects of the present disclosure, in accordance with aspects of the present disclosure.

FIG. 2 is a block diagram of a facial recognition system 200 employing facial recognition techniques by using a theme park database, as well as park area databases corresponding to the park areas of FIG. 1, in accordance with aspects of the present disclosure. The facial recognition system 200 may include one or more image capture devices 104. The image capture device 104 may include a camera 202 that may capture facial images 203 of the guests 120 (FIG. 1). For example, the image capture device 104 may include any suitable device that may include the camera 202, such as a digital camera, an action camera, a high-speed camera, a hidden camera, tablet computer, a web-camera connected to a desktop or laptop, and/or any suitable device that may capture the image of the face of a guest 120.

The image capture device 104 may include a display 204 that may provide instructions to the guest 120. The display 204 may include a liquid crystal display (LCD), a segment display, a light-emitting diode (LED) display, an organic LED (OLED) display, and/or any suitable device capable of displaying information. For example, the display 204 may display a countdown to the guest 120 for capturing the image, a message that an attempt to capture the image was unsuccessful, a message indicating that the image has to be captured again (e.g., because it was of an inadequate quality), a message that the image was successfully captured, and/or any other suitable content for the guest 120 or park attendant.

The image capture device 104 may also include a controller 210 that controls the image capture device 104. The controller 210 may include a processor 212 that executes instructions to control the image capture device 104, and a memory 214 that stores the instructions. The image capture device 104 may also include a communication interface 216 that enables the image capture device 104 to communicate with other devices, such as the computing system 102, via the communication network 106. Details regarding the processor 212, the memory 214, the communication interface 216, and the communication network 106 are discussed below. It should be understood that the theme park 100 (FIG. 1) may include any suitable number of image capture devices 104.

The computing system 102 may include a storage device 220, a communication interface 236, and a controller 230. The controller 230 may include a processor 232, a memory 234, and a communication interface 236. Details regarding the storage device 220, the processor 232, the memory 234, and the communication interface 236, are discussed below.

The computing system 102 may execute facial identification logic 240 to implement the process discuss below with respect to FIG. 3. The facial identification logic 240 may be stored as machine-readable instructions stored in the memory 234 and executed by the processor 232. In an embodiment, the facial identification logic 240 may be adjusted or tuned to set conditions on acceptable live images captured by the image capture device 104 to set standards for suitable and unsuitable live images.

For example, the facial identification logic 240 may include artificial intelligence (AI) logic that may track successful and/or unsuccessful attempts at capturing facial images with desired characteristics (e.g., sufficient to distinguish one guest from another, or a sufficient representation of the geometric features of the face of the guest 120) based on clarity of the captured facial image. The AI logic may adjust or tune the parameters for determining acceptable facial images captured by the image capture device 104 to increase success and efficiency over time. In an embodiment, the AI logic may define a threshold value (e.g., percentage, ratio, or the like) of image quality of the captured facial images of the guests 120 (e.g., based on the percentage, ratio, or the like of desired characteristics in the captured facial images). For example, if the threshold value of parameters defining image quality for a captured facial image is insufficient, the artificial intelligence logic may increase or decrease respective threshold values to increase or optimize the guest throughput in the theme park 100.

As discussed above, each of the image capture devices 104 and the computing system 102 may include a respective controller 210, 230 that includes one or more respective processors 212, 232 and one or more respective memory devices 214, 234. The processors 212, 232 (e.g., microprocessors) may execute software programs and/or instructions that facilitate capturing and analyzing facial images 203, determining whether the captured facial image 203 matches existing facial identification data 242, storing or removing facial identification data 242 in or from the storage device 220, and so forth. Moreover, the processors 212, 232 may include multiple microprocessors, one or more "general-purpose" microprocessors, one or more special-purpose microprocessors, and/or one or more application specific integrated circuits (ASICs), or some combination thereof. For example, the processors 212, 232 may include one or more reduced instruction set computer (RISC) processors.

The memory devices 214, 234, as well as the storage device 220, may store information such as control software, look up tables, configuration data, and so forth. In an embodiment, the processors 212, 232, the memory devices 214, 234, and/or the storage device 220 may be external to the respective controllers 210, 230. Each of the memory devices 214, 234 and the storage device 220 may include a tangible, non-transitory, machine-readable-medium, such as a volatile memory (e.g., a random-access memory (RAM)) and/or a nonvolatile memory (e.g., a read-only memory (ROM)). Each of the memory devices 214, 234 and the storage device 220 may include one or more storage devices (e.g., nonvolatile storage devices) that may include read-only memory (ROM), flash memory, a hard drive, and/or any other suitable optical, magnetic, or solid-state storage medium.

The memory devices 214, 234 and the storage device 220 may store a variety of information used for various purposes. For example, the memory devices 214, 234 and the storage device 220 may store machine-readable and/or processor-executable instructions (e.g., firmware or software) for the processors 212, 232 to execute, such as instructions that facilitate capturing and/or storing facial identification data 242 associated with facial images captured by the image capture device 104.

The computing system 102 may receive facial images 203 and store the facial images 203 and corresponding facial identification data 242 in the storage device 220. As discussed in more detail below, the storage device 220 may include a theme park database 250, park area databases 252, and profile data 254. The profile data 254 may include respective information for the guests 120. For example, the profile data 254 may include identification information (e.g., name, age, height, weight, birthdate and so forth), access information (e.g., the package purchased by a particular guest 120, the package granting certain access/restrictions to the particular guest 120), and so forth. The profile data 254 may be stored in a database, for example, having the information for each guest 120 in respective tables with the profile data 254 in corresponding entries of the table. In an embodiment, the computing system 102 may associate the facial identification data 242 with the profile data 254, such that employing the facial recognition techniques described herein may cause the computing system 102 to reference the profile data 254 based on the facial image 203.

The computing system 102 may store the facial identification data 242 in the theme park database 250 as corresponding guests 120 enter the theme park 100 and may remove the facial identification data 242 in the theme park database 250 as corresponding guests 120 exit the theme park 100. In this manner, the theme park database 250 includes only facial identification data 242 of guests 120 inside the theme park 100, thereby reducing the size of the theme park database 250 as guests exit the theme park 100.

Additionally, as the guest 120 enters a particular area 130 (FIG. 1) within the theme park 100, the computing system 102 may receive a new facial image 203 of the guest 120 from the image capture device 104 associated with the particular area 130. The computing system 102 may match the new facial image 203 to facial identification data 242 in the theme park database 250, and then store the facial identification data 242 from the theme park database 250 in the park area database 252 corresponding to the particular area 130. In this manner, as the guest 120 interacts with the image capture device 104 in the particular area 130, the accuracy and speed of performing facial recognition techniques described above may be improved because facial recognition calculations are performed on the smaller park area database 252 instead of the larger theme park database 250.

The image capture devices 104, the computing system 102, and other features of the theme park 100 may also include a respective communication interface 216, 236 communicatively coupled to the respective controllers 210, 230, enabling the respective controllers 210, 230 to communicate with any suitable communication network, including the communication network 106. For example, the communication network 106 may include a wireless network, such as a mobile network, Wi-Fi, Bluetooth, local area network (LAN), wide area network (WAN), Internet, and the like. The communication interfaces 216, 236 may enable the respective controllers 210, 230 to communicate with the communication network 106. In this manner, the communication interfaces 216, 236 may enable the controllers 210, 230 to communicate with each other to enable exchange of information to facilitate implementing facial recognition techniques.

Figure 4:
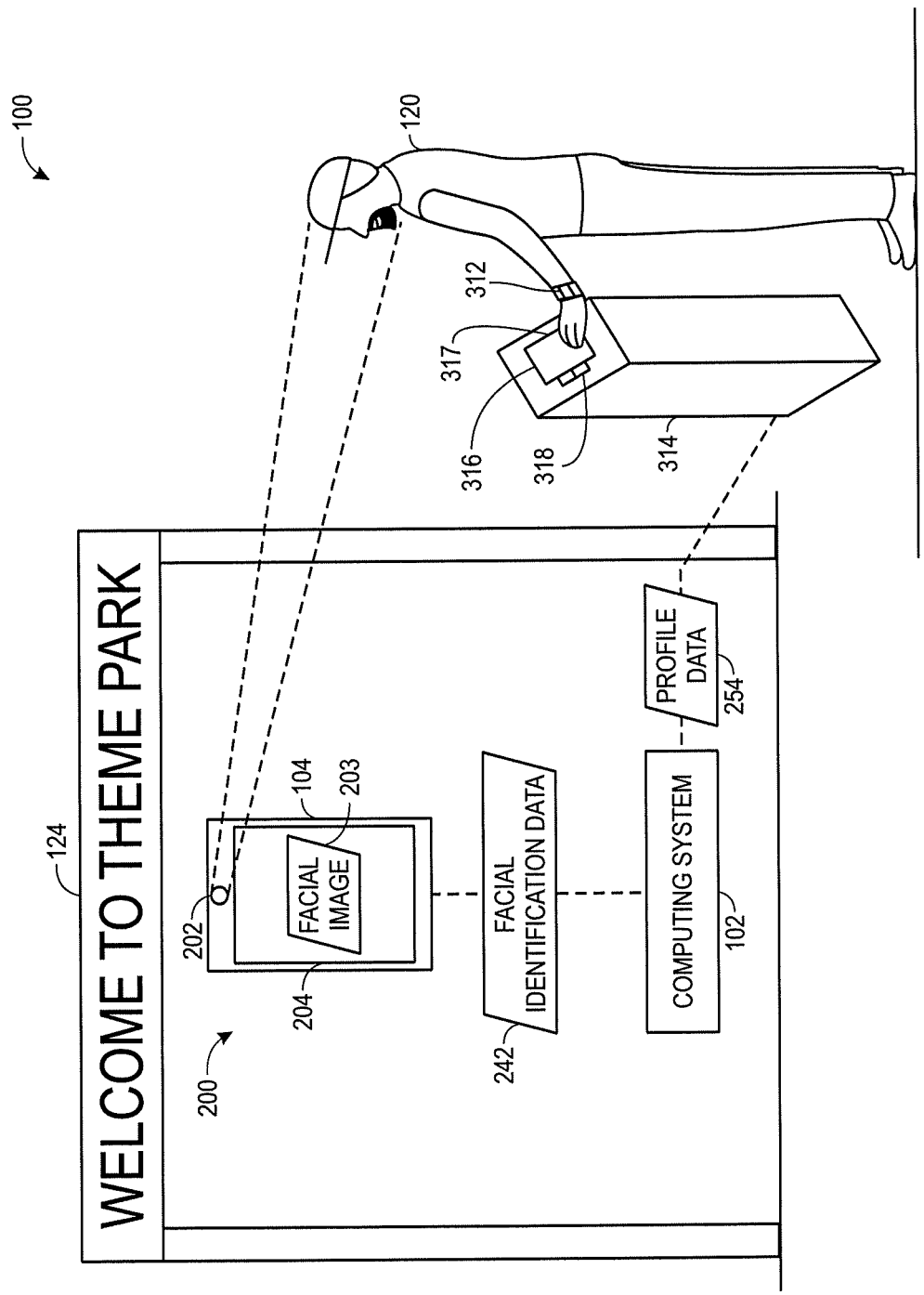
FIG. 4 is a perspective view of a guest entering the theme park of FIG. 1 and triggering the facial recognition system of FIG. 2 to perform the process of FIG. 3, in accordance with aspects of the present disclosure.
Figure 5:
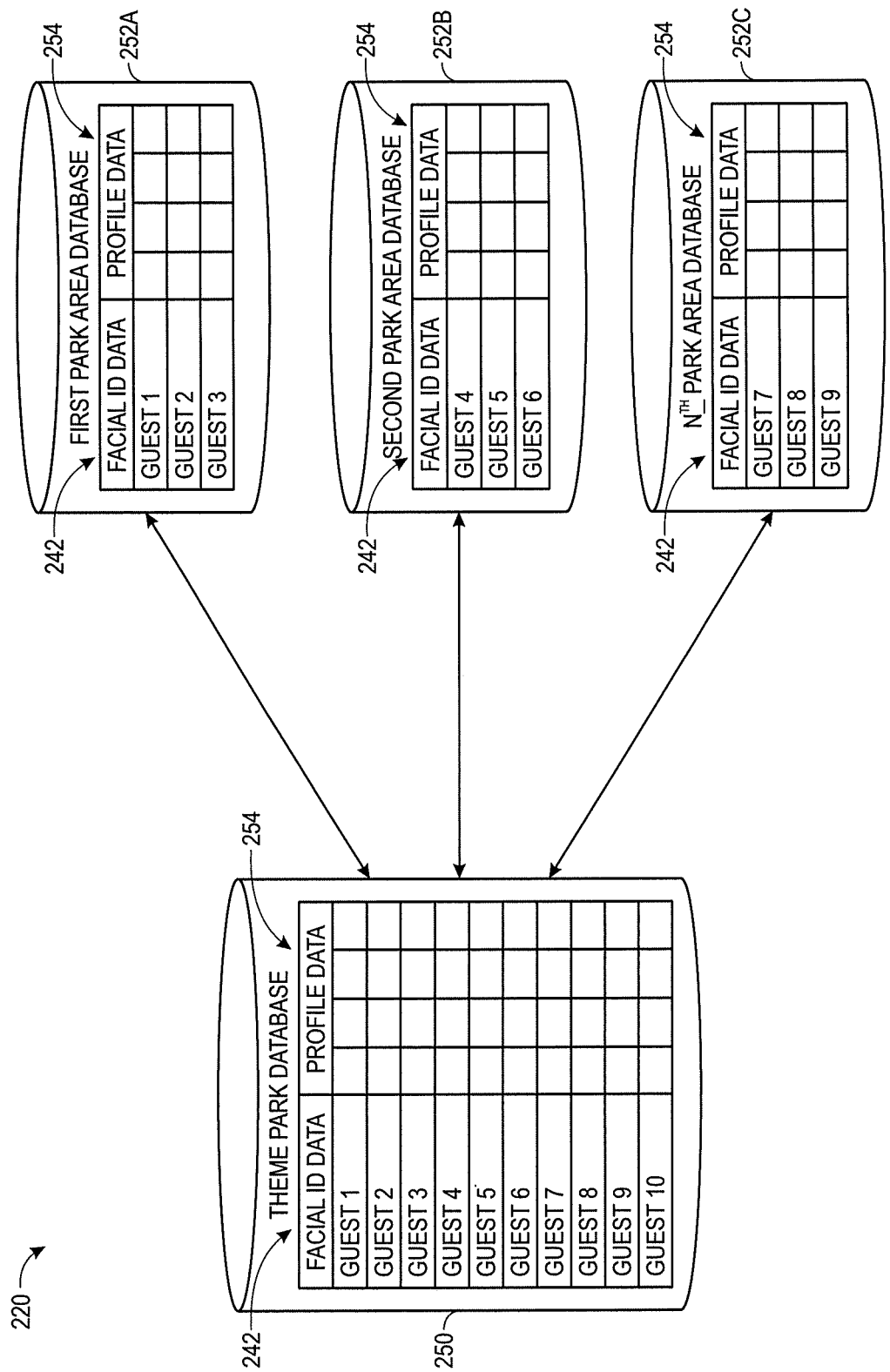
FIG. 5 is a block diagram of the theme park database of FIG. 2 and the park area databases of FIG. 2, in accordance with aspects of the present disclosure.

FIG. 3 is a flow diagram of a process 300 for increasing facial recognition throughput of the theme park 100 of FIG. 1, in accordance with aspects of the present disclosure. In an embodiment, the process 300 may be performed by the facial recognition system 200 of FIG. 2. To facilitate illustration of process 300, FIGS. 3-6 will be discussed together. That is, as process 300 is described, the present disclosure may refer to FIGS. 4-6. FIG. 4 is a perspective view of a guest 120 (FIG. 1) entering the theme park 100 of FIG. 1, in accordance with aspects of the present disclosure. FIG. 5 is a block diagram of the theme park database 250 of FIG. 2 and the park area databases 252 of FIG. 2, in accordance with aspects of the present disclosure.

The process 300 may be performed by the facial recognition system 200 of FIG. 2 to execute facial recognition techniques in a more efficient manner. In an embodiment, the computing system 102 may perform the process 300. For example, the process 300 may be in the form of non-transitory computer-readable instructions executable by suitable processing circuitry (e.g., the processor 232 of FIG. 2) of the computing system 102. At least some of the steps of the process 300 may be executed by employing AI and/or machine learning methodologies. The process 300 is provided as an example, such that certain illustrated steps of the process 300 may be performed in other orders, skipped, or repeated, in accordance with the present disclosure.

Process 300 includes receiving (process block 310) the facial image 203 (FIG. 2) from the image capture device 104 (FIG. 1-2) at the theme park entrance location 124 (FIG. 1). Turning to FIG. 4, after waiting in a park entrance queue, the image capture device 104 at the park entrance location 124 (FIG. 1) may capture a facial image 203 of the guest 120 by way of the camera 202. The image capture device 104 (or the computing system 102) may determine whether the facial image 203 is of sufficient quality, such that target features of the face may be discernable with enough precision to determine the geometry of the face of the guest 120, a threshold number of characteristics of the face that are identifiable or distinguishable from other guests, and so forth. The image capture device 104 may cause the camera 202 to attempt to capture a threshold number of facial images 203 or a video of the guest 120 moving (e.g., rotating, translating, and so forth) their face. Additionally or alternatively, the image capture device 104 may capture a variety of facial images 203 and the image capture device 104 (or the computing system 102) may choose the facial images exceeding a threshold quality value or may choose the top number (e.g., three, four, ten, or any suitable number) of facial images 203. In an embodiment, image quality may be based on Image Quality Assessment (IQA), considering image factors such as contrast, blur, noise, artifacts, distortion, or any combination thereof, of the facial image 203, to name a few image quality factors. However, it should be understood that any suitable IQA technique(s) may be employed to determine a suitable quality of the facial image 203.

The computing system 102 may determine the facial identification data 242 from the facial image 203 satisfying the IQA (e.g., by performing AI or machine learning methodologies). For example, the computing system 102 may receive the facial image 203 and determine the precise location of certain facial features with respect to one another based on the facial image 203. In an embodiment, the computing system 102 may determine the location of the facial features, such as the eyebrows, eyes, nose, mouth, face contour, jawline, ears, hair, facial hair, and so forth. The computing system may generate a three-dimensional (3D) or two-dimensional (2D) rendering of the face of a guest 120 (FIG. 1) based on the facial image 203. In addition or alternative to geometric based facial recognition techniques, it should be understood that any suitable facial recognition methodologies may be used such as piecemeal-based methodologies, statistical-based methodologies (e.g., pixel template matching, statistical-based, principal component analysis (PCA), Kernel PCA, discrete cosine transformation (DCT), linear discriminant analysis (LDA), locality preserving projections (LPP), Gabor wavelet, and so forth), and/or neural network methodologies (e.g., neural networks with Gabor filters, neural networks and Hidden Markov Models (HMM), fuzzy neural network), to name a few.

The guest 120 may have a tangible item, such as a wearable device 312, mobile device, or entrance ticket, which may include the profile data 254. The computing system 102 may receive information indicative of the profile data 254 and then link the profile data 254 to the facial identification data 242 associated with the captured facial image 203. For example, a guest 120 may purchase VIP access to the theme park 100 ahead of time. The guest 120 may scan a bar code from the mobile device, a beacon from their wearable device 312, or a bar code from the entrance ticket, at a scanning station 314.

When the entrance ticket is used, the entrance ticket may include any suitable document that may be scanned, such as any suitable ticket (e.g., entry ticket, a theme park ticket, an entertainment ticket, a special status pass, and the like), an identification document (e.g., a passport, a driver's license, and the like), a form of payment (e.g., a credit card, a debit card, and the like), and so forth. In particular, the entrance ticket may provide an entitlement or a credential for the guest 120 that enables certain privileges (e.g., entry into a theme park or sporting event, access to financial resources, or the like). As such, the guest 120 may scan the entrance ticket using the scanning station 314 to send information associated with the entrance ticket to the computing system 102. The computing system 102 may then link and associate the profile data (associated with the entrance ticket) to the facial identification data 242 and gain admission to a theme park, an entertainment venue, a concert, a movie theater, a play, a special level (e.g., a club level or a VIP level) of an event, or the like. Additionally, the entrance ticket may serve as an additional or back-up method for authenticating the identity of the guest 120, or to pay for a product or service.

In either case, the scanning station 314 may read an identification code of the wearable device 312, mobile device, and/or entrance ticket to authenticate the guest 120. For example, the scanning station 314 may include any suitable type of identification code reader, such as a barcode reader, Quick Response (QR) code reader, radio frequency identification (RFID) code reader, near field communication tag reader, or the like. As such, the identification code may include any suitable type of identification code, such as a barcode, Quick Response (QR) code, radio frequency identification (RFID) code, near field communication tag, or the like. Moreover, in an embodiment, the entrance ticket may be an electronic document, and be displayed on the guest's electronic device, such as a mobile phone (e.g., a smartphone), a tablet computer, a wearable device 312, or any other suitable device that may display the identification code.

The identification code of the wearable device 312, mobile device, and/or entrance ticket may be aligned with a scanning region of the scanning station 314 to enable the scanning station 314 to read the identification code. In an embodiment, such as where the identification code is a barcode or a QR code, the scanning station 314 may read elements (e.g., markings) of the identification code by illuminating the identification code with an illumination system (e.g., a red light). A sensor of the scanning station 314 may detect reflected light from the illumination system and generate an analog signal sent to a decoder. The decoder may interpret the analog signal, validate the identification code (e.g., using a check digit process), and convert the identification code into usable data (e.g., text).

The scanning station 314 may present, via a display 316, to the guest 120 a list of instructions 317 for scanning the tangible item and linking the profile data 254 to the facial identification data 242. Alternatively, the tangible item (e.g., wearable device 312, mobile device, and/or entrance ticket) may be omitted, such that the guest 120 may engage with a user interface 318 (e.g., button and/or touch screen interface) to log in to a password-protected profile including the profile data 254 to associate the profile data 254 with the facial identification data 242. In this manner, the process of entering the theme park 100 may be automated and/or speed up as multiple entrance locations 124 may include multiple image capture devices 104 and scanning stations 314, thereby increasing guest 120 throughput.

Turning back to FIG. 3, the process 300 includes storing (process block 320) the facial identification data in the theme park database 250. As described above, the theme park database 250 (FIG. 2) may include a large database that stores the facial identification data 242 of the guests 120 in the theme park database 250. Because a theme park 100 may have the capacity to accommodate hundreds or thousands of guests, performing facial recognition techniques of guests 120 in the theme park 100 may include matching a facial image 203 of the guest 120 against the facial identification data 242 in the theme park database 250. Such implementation may be computationally intensive for the computing system and may result in delays.

To increase facial recognition throughput, the theme park 100 may include image capture devices 104 at entrances to park areas 130 (FIG. 1). The computing system 102 may receive (process block 330) the facial image 203, via the camera 202 of the image capture device 104 at the particular park area 130. The computing system 102 may match the facial image 203 captured with the image capture device 104 associated with the particular park area 130 to facial identification data 242 in the theme park database 250. Matching the facial image 203 to facial identification data 242 may include performing any suitable facial recognition matching techniques such as EigenFaces face recognizer, Fischer-Faces recognizer, and/or local binary pattern histograms, to name a few.

In response to the facial image 203 captured with the image capture device 104 associated with the particular park area 130 matching the facial identification data 242 of an existing entry in the theme park database 250, the computing system 102 may copy and store (process block 340) the matching facial identification data 242 from the theme park database 250 into the park area database 252 associated with the first park area 132. In an embodiment, storing (process block 340) the matching facial identification data 242 from the theme park database 250 into the park area database 252 associated with the first park area 132 may include removing the matching facial identification data 242 from the theme park database 250. In this manner, as guests 120 enter particular park areas 130 in the theme park 100, the overall size of the theme park database 250 may be reduced to increase the throughput of guests 120 entering the theme park 100 or entering the various areas 130.

Turning to FIG. 5, the storage device 220 may maintain one or more repositories of facial identification data 242. As illustrated, the storage device 220 may include the theme park database 250, which includes facial identification data 242 of the guests 120 in the theme park 100. The storage device 220 may also include a park area database 252 for each of the park areas 130. In this example, the storage device 220 includes a first park area database 252A, a second park area database 252B, and an Nth park area database 252C corresponding to n number of park areas 130.

In addition to storing the facial identification data 242, the theme park database 250 may store the profile data 254 associated with the corresponding guests 120. In the illustrated example, the theme park database 250 stores the facial identification data 242 and the corresponding profile data 254 for ten guests 120; the first park area database 252A stores the facial identification data 242 and the corresponding profile data 254 for three of the ten guests, the second park area database 252B stores the facial identification data 242 and the corresponding profile data 254 for three other of the ten guests. As mentioned above, as guests 120 engage with an image capture device 104 at the entrance location 124 of the theme park 100 and are granted entry into the theme park 100, their facial identification data 242 may be newly added and stored (process block 320) to the theme park database 250. As the guest 120 moves into a particular park area 130, the computing system 102 may copy and store (process block 340) corresponding facial identification data 242 associated with the guest 120 in the park area database 252 associated with the particular park area 130. Doing so may cause the computing system 102 to remove the corresponding facial identification data 242 associated with the guest 120 from the theme park database 250.

While in the illustrated example the theme park database 250 and the park area databases are illustrated as storing facial identification data 242 and profile data 254, it should be understood that in an embodiment the theme park database 250 and/or the park area databases 252 may only include the facial identification data 242. In this case, the facial identification data may include metadata, pointers, or the like, mapping corresponding entries of facial identification data 242 to corresponding profile data 254. Accordingly, the facial identification data 242 and the profile data may be located in different databases or in different tables in the same database.

While the theme park 100 is discussed as being divided into multiple areas 130, each with corresponding databases, it should be understood that the theme park 100 may be divided into any number of park areas 130, and the park areas 130 may be divided into any number of subareas, each with a corresponding database. For example, the theme park 100 may be divided into park areas 130, the areas 130 may be divided into subareas, the subareas may be divided into entertainment rides/buildings, and so forth, such that the theme park 100, areas 130, subareas, and entertainment rides/buildings include corresponding image capture devices 104 and databases. By employing aspects of the disclosure in such a theme park, facial recognition accuracy and throughput may be increased as the size of databases, and therefore computational complexity associated with performing the facial recognition techniques, is reduced.

Turning to FIG. 3, as guests 120 leave particular park areas 130 and enter the general theme park 100, an image capture device 104 at the exit may receive a facial image 203. The computing system 102 may receive the facial image 203 captured at the area exit and remove (process block 350) the facial identification data 242 from the park area database 252. As mentioned above, the computing system 102 may remove from the park area database 252 the facial identification data 242 having the closest match to the facial image 203 captured at the area exit. In this manner, the entries in the park area database 252 may be maintained current and without entries that will likely not be used (e.g., entries corresponding to guests 120 who have left the park area 130).

Turning to FIG. 5, removing the facial identification data 242 from the park area database 252 may cause the park area database to be reduced in size. In an embodiment, removing the facial identification data 242 from the park area database 252 may cause the computing system 102 to add the removed facial identification data 242 to the theme park database 250. For example, if illustrated guest 3 were to leave the first park area 132, the computing system 102 may remove the facial identification data 242 associated with guest 3 from the park area database 252 and may cause the computing system 102 to add the facial identification data 242 to the theme park database 250.

Figure 6:
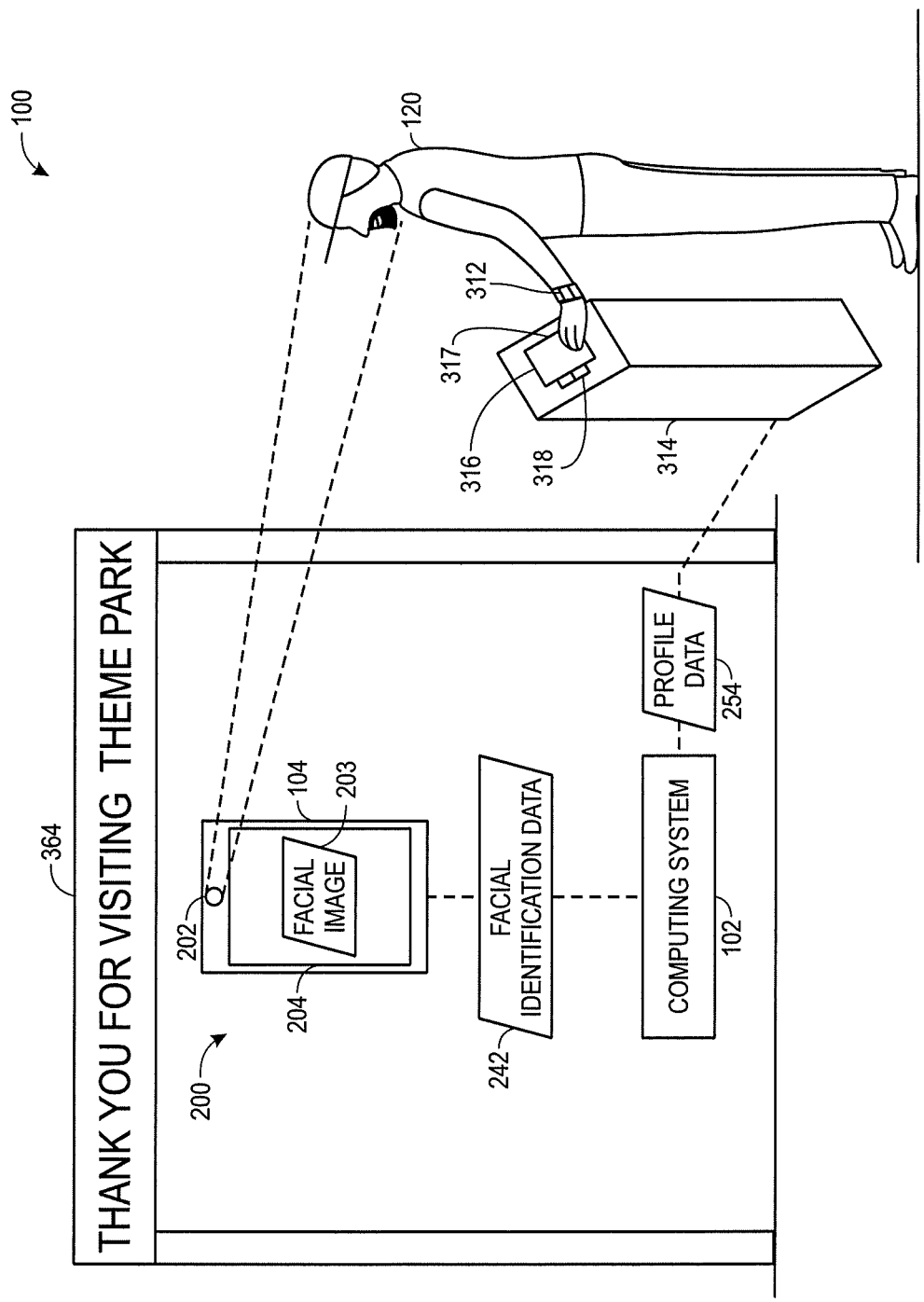
FIG. 6 is a perspective view of a guest leaving the theme park of FIG. 1 and triggering the facial recognition system of FIG. 2 to perform the process of FIG. 3, in accordance with aspects of the present disclosure.

Turning to FIG. 6, as guests 120 leave the theme park 100, an image capture device 104 at a theme park exit 364 may capture a facial image 203 of the guest 120. Turning to FIG. 3, the computing system 102 may receive the facial image 203 captured at the theme park exit 370 and remove (process block 360) the corresponding facial identification data 242 from the theme park database 250. The computing system 102 may remove from the theme park database 250 the facial identification data 242 having the closest match to the facial image 203 captured at the theme park exit 364. In this manner, the entries in the theme park database 250 may be maintained current and without entries that will likely not be used (e.g., entries corresponding to guests 120 who have left the theme park 100).

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

Technical effects of the present disclosure include systems and methods that increase facial recognition throughput, reduce time to process facial recognition access, and/or improve the accuracy of verifying facial identities by reducing search data as a person traverses through a theme park. Technical effects of the present disclosure include storing facial identification data in a theme park database as guests enter a theme park and removing facial identification data in the theme park database as guests exit the theme park. In this manner, the theme park database may include only facial identification data of guests inside the theme park, and not of guests who have left the theme park, thereby reducing the size of the theme park database as guests exit the theme park. Similarly, this approach may be implemented within the various areas (and subareas) of the theme park, as described above, such that the size of a respective database associated with the areas of the park only includes entries corresponding to guests in the particular park area.

This written description uses examples of the presently disclosed embodiments, including the best mode, and also enable any person skilled in the art to practice the disclosed embodiments, including making and using any devices or systems and performing any incorporated methods. The patentable scope of the disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . ." or "step for [perform]ing [a function]. . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for increasing facial recognition throughput, the system comprising:
   a first image capture device configured to capture first facial image data, wherein the first image capture device is associated with an entrance of a venue, and wherein the first facial image data is stored in a first database;
   a second image capture device configured to capture second facial image data, wherein the second image capture device is associated with an entrance of an area within the venue, and wherein the area is associated with a second database; and
   a third image capture device configured to capture third facial image data, wherein the third image capture device is associated with an exit from the area of the venue; and
   a computing system communicatively coupled to the first image capture device, the second image capture device, and the third image capture device, wherein the computing system comprises processing circuitry and a memory device communicatively coupled to the processing circuitry, the memory device being configured to store instructions executable to cause the processing circuitry to:
      receive the second facial image data;
      determine a first correlation between the second facial image and the first facial image data;
      in response to the second facial image data correlating to the first facial image data, add the first facial image data to the second database;
      receive the third facial image;
      determine a second correlation between the third facial image data and the first facial image data; and
      in response to the third facial image data correlating to the first facial image data, remove the first facial image data from the second database.

2. The system of claim 1, wherein the instructions are executable to cause the processing circuitry to determine the first correlation by comparing first geometric facial features of the first facial image data stored in the first database to second geometric facial features of the second facial image data.

3. The system of claim 1, comprising a wearable device communicatively coupled to the computing system.

4. The system of claim 3, wherein the computing system is configured to receive an identifier of the wearable device, and wherein the instructions are executable to cause the processing circuitry to:
   receive profile data associated with the identifier; and
   link the profile data with the first facial image data of a guest wearing the wearable device.

5. The system of claim 4, wherein the profile data comprises identification information for the guest, access information indicative of access rights with respect to features of the venue, or both.

6. The system of claim 1, wherein the instructions are executable to cause the processing circuitry to, in response to the second facial image data correlating to the first facial image data, remove the first facial image data from the first database.

7. The system of claim 6, wherein the instructions are executable to cause the processing circuitry to,
   in response to the third facial image correlating to the first facial image data,
   add the first facial image data to the first database.

8. The system of claim 1, wherein the first database is separate from the second database.

9. A method, comprising:
   determining, via processing circuitry, entrance facial identification data from a first facial image captured by an entrance image capture device positioned at an entrance to a venue;
   storing, via the processing circuitry, the entrance facial identification data in a venue database, wherein the venue database stores a plurality of facial identification data entries;
   transferring, via the processing circuitry, the entrance facial identification data from the venue database and into an area database associated with an area of the venue in response to a second facial image captured at an entrance to the area of the venue correlating to the entrance facial identification data;
   transferring, via the processing circuitry, the entrance facial identification data from the area database to the venue database in response to a third facial image captured at an exit from the area of the venue correlating to the entrance facial identification data;
   receiving, via the processing circuitry, a fourth facial image captured by an exit image capture device positioned at an exit of the venue;
   determining, via the processing circuitry, a correlation between exit facial identification data associated with the fourth facial image and an entry of the plurality of facial identification data entries; and
   removing, via the processing circuitry, the entry of the plurality of facial identification data entries from the venue database in response to determining that the exit facial identification data correlates to the entry of the plurality of facial identification data entries.

10. The method of claim 9, comprising:
    receiving, via the processing circuitry, a fifth facial image from an image capture device associated with a feature of the venue, wherein the fifth facial image comprises a live facial image of a guest seeking access to the feature; and
    authenticating, via the processing circuitry, the fifth facial image to grant the access to the feature in response to determining that the fifth facial image correlates to at least one entry of the plurality of facial identification data entries.

11. The method of claim 9, comprising:
    receiving a request for guest authentication within the venue; and
    performing the guest authentication based on the plurality of facial identification data entries.

12. The method of claim 9, wherein storing the entrance facial identification data comprises storing the entrance facial identification data in response to the first facial image satisfying one or more image quality parameters.

13. The method of claim 9, comprising associating, via the processing circuitry, the entrance facial identification data to profile data associated with a guest having the entrance facial identification data.

14. A facial recognition system to increase facial recognition throughput, the facial recognition system comprising:
    a primary image capture device configured to capture a first facial image at an entrance to a theme park;

a plurality of secondary image capture devices corresponding to a plurality of areas of the theme park, wherein each secondary image capture device of the plurality of secondary image capture devices is configured to capture a secondary facial image at corresponding area of the plurality of areas of the theme park;

a storage device comprising:
  a theme park database comprising facial identification data associated with the first facial image; and
  a plurality of park area databases, wherein each park area database of the plurality of park area databases is associated with a respective area of the plurality of areas, wherein each park area database of the plurality of park area databases comprises facial identification data associated with a respective secondary facial image; and a computing system communicatively coupled to the primary image capture device, the plurality of secondary image capture devices, and the storage device, wherein the computing system comprises processing circuitry and a memory device communicatively coupled to the processing circuitry and configured to store instructions to cause the processing circuitry to:
  receive the first facial image to generate corresponding facial identification data and store the corresponding facial identification data in the theme park database;
  receive a first secondary facial image captured by a first secondary image capture device of the plurality of secondary image capture devices to determine a first correlation between the first secondary facial image and the corresponding facial identification data, wherein the first secondary image capture device is associated with an entrance of an area of the plurality of areas;
  add the corresponding facial identification data from the theme park database to a park area database associated with the area based on the first correlation;
  receive a second secondary facial image captured by a second secondary image capture device of the plurality of secondary image capture devices to determine a second correlation between the second secondary facial image and the corresponding facial identification data, wherein the second secondary image capture device is associated with an exit of the area of the plurality of areas; and
  remove the corresponding facial identification data from the area database associated with the area based on the second correlation.

15. The facial recognition system of claim 14, wherein the instructions are configured to cause the processing circuitry to determine the correlation by comparing geometric facial features of the secondary facial image to geometric facial features of the facial identification data in the theme park database.

16. The facial recognition system of claim 14, wherein data in the plurality of park area databases is copied from the theme park database.

17. The facial recognition system of claim 1, wherein the second image capture device is the same as the third image capture device.

18. The facial recognition system of claim 1, comprising a scanning station associated with the entrance of the area within the venue, the exit from the area within the venue, or both, wherein the scanning station comprises the second image capture device, the third image capture device, or both.

19. The facial recognition system of claim 18, comprising a wearable device, wherein the computing system is configured to receive an identifier of the wearable device from the scanning station, and wherein the instructions are executable to cause the processing circuitry to:
  receive profile data associated with the identifier; and
  link the profile data with corresponding facial identification data based on the first facial image of a guest wearing the wearable device.

20. The facial recognition system of claim 19, wherein the profile data comprises identification information for the guest, access information indicative of access rights with respect to features of the venue, or both.

* * * * *